(No Model.)
G. ARROWSMITH.
FENCE WIRE STRETCHER.
No. 254,587. Patented Mar. 7, 1882.
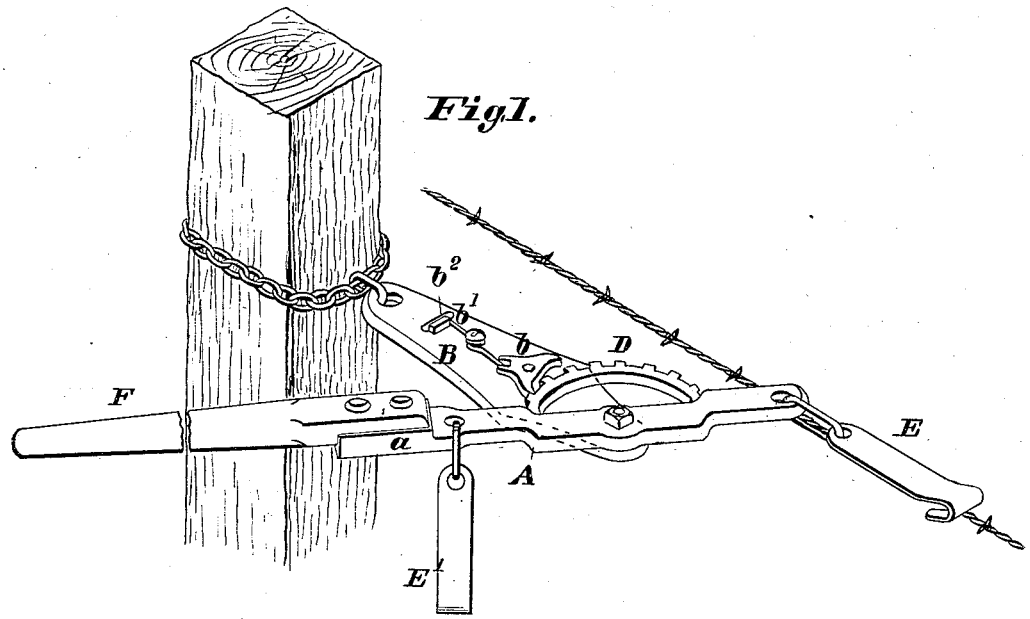
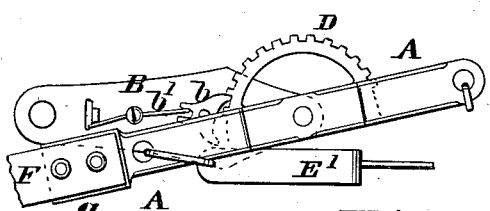
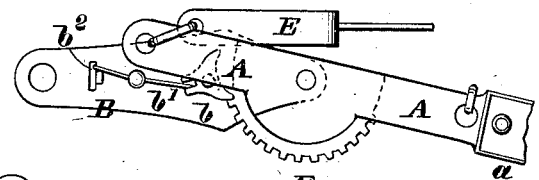
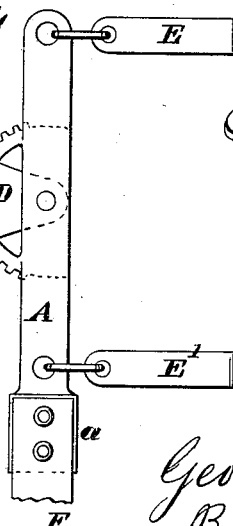
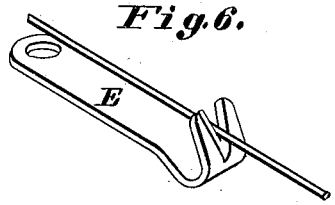
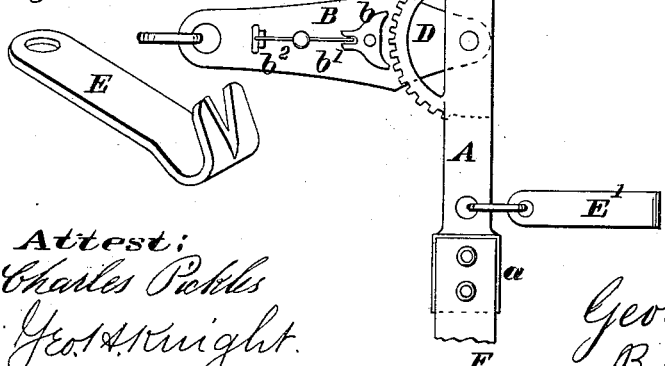
Attest:
Charles Pickles
Geo. H. Knight
Inventor:
George Arrowsmith
By Knight Bro.
Attys.

UNITED STATES PATENT OFFICE.

GEORGE ARROWSMITH, OF ST. LOUIS, MISSOURI.

FENCE-WIRE STRETCHER.

SPECIFICATION forming part of Letters Patent No. 254,587, dated March 7, 1882.

Application filed December 15, 1881. (No model.)

*To all whom it may concern:*

Be it known that I, GEORGE ARROWSMITH, of the city of St. Louis and State of Missouri, have invented a certain new and useful Improvement in Fence-Wire Stretchers, of which the following is a full, clear, and exact description, reference being had to the accompanying drawings, forming part of this specification.

My invention consists in a bar having pivoted to its center an arm, to which is pivoted a reversible pawl engaging with the teeth of a bracket secured to or formed upon the bar. The other end of the arm is provided with a means for securing it to one of the fence-posts, and at or near each end of the bar is secured a claw for taking hold of the wire. To one or both ends of the bar, preferably to one only, is also secured a lever for operating the device.

In the drawings, Figure 1 is a perspective view of the device, showing it secured to a fence-post, and one of the claws engaged with a wire being stretched. Figs. 2, 3, and 4 show the device in different positions. Fig. 5 is an under perspective view of one of the claws; and Fig. 6 is a similar view, showing the claw engaged with a wire.

A represents the bar, at or near the center of which is pivoted one end of an arm, B, the other end of which is provided with a means for securing it to a fence-post.

D is a bracket secured to or formed upon the bar A. On the periphery of this bracket are teeth or cogs, which are engaged by a reversible pawl, $b$, pivoted to the arm B. The pawl is held in contact with the teeth of the bracket by a spring, $b'$, secured to the arm, substantially as shown.

E E' are claws attached to the bar A, one at or near each end, by any suitable means. I have shown them connected by means of links.

F is an operating-lever, secured to a projecting end, $a$, of the bar A.

The operation is as follows: The device is first secured to one of the fence-posts, as shown in Fig. 1. The wire to be stretched is then engaged by the claw E, and the reversible pawl thrown into the position shown in Fig. 1 by means of the spring $b'$. Power is then applied to the lever F, which is moved in the direction away from the post, and the wire thus tightened, the pawl slipping over the teeth of the bracket, but preventing the return of the parts by engaging with the teeth, as shown. If, when the lever is moved to its full extent in this direction, as shown in Fig. 3, the wire has not been sufficiently tightened, the claw E' is engaged with the wire and the pawl $b$ reversed by changing the free end of the spring to the other side of the teat $b^2$, and the claw E released from the wire and the operating-lever moved in the other direction to any extent, until it assumes the position shown in Fig. 2; and then, if the wire has not been tightened sufficiently, the operation is repeated, and so on until any degree of tightness is acquired.

I do not confine myself to the exact construction of the pawl $b$, which consists of a block pivoted to the arm B, and having three projections, two of which are capable of engagement with the teeth of the bracket D, as shown, and the other being slotted to receive the end of the spring $b'$. The block is so pivoted to the arm that it is a less distance from the rivet to the bracket than from the rivet to the engaging ends of the pawl. Thus the rivet acts as a lock to the pawl, as any construction of pawl that will prevent the return of the parts would answer the purpose.

I claim as my invention—

The combination of the bar A, arm B, bracket D, pawl $b$, or its equivalent, claws E and E', and lever F, substantially as and for the purpose set forth.

GEORGE ARROWSMITH.

Witnesses:
SAML. KNIGHT,
GEO. H. KNIGHT.